United States Patent Office 3,516,913
Patented June 23, 1970

3,516,913
ELECTRODEPOSITION OF HEAT - HARDENABLE WATER - DISPERSIBLE HYDROXY-FUNCTIONAL HYDROPHYLIC RESINS OF LOW ACID VALUE AND MIXTURES THEREOF WITH WATER INSOLUBLE AMINOPLAST RESINS
Kazys Sekmakas and Edward A. Gauger, Jr., Chicago, and Lester A. Henning, Arlington Heights, Ill., assignors to De Soto, Inc., Chicago, Ill., a corporation of Delaware
No Drawing. Continuation-in-part of application Ser. No. 615,048, Feb. 10, 1967. This application Apr. 28, 1967, Ser. No. 634,480
Int. Cl. B01k 5/02; C23b 13/00
U.S. Cl. 204—181       43 Claims

ABSTRACT OF THE DISCLOSURE

Aqueous dispersions especially adapted to be electrodeposited at the anode to form corrosion resistant coatings after baking to cure the same are formulated based on water-dispersible hydroxy-functional hydrophylic resins having an acid number of from about 8 to about 70 and which are preferably formed by esterifying a part of the carboxy functionality of a carboxy-functional resin with an epoxide, preferably a monoepoxide, to reduce the acid number and to generate hydroxy functionality remote from the linear backbone of the resin. The resin is produced as a solution in water-miscible organic solvent by reaction in the presence of an alkaline catalyst which causes preferential reaction with the carboxy groups to take place. The resin solution is dispersed in water with the aid of a nitrogenous base, such as ammonia or an amine and the dispersed resin is heat-hardening per se. Cure is preferably effected using a water insoluble heat-hardening benzoguanamine-formaldehyde resin which deposits in direct proportion to its concentration and which increases the resistivity of the film which is deposited. Electrodeposition at a pH above 8.5 is particularly contemplated and the electrodeposition bath may be replenished with amine deficient resin in water-miscible solvent solution.

---

The present application is a continuation-in-part of our prior application, Ser. No. 615,048, filed Feb. 10, 1967.

The present invention relates to aqueous colloidal dispersions especially adapted to be electrodeposited at the anode, and to certain hydrophylic hydroxy-functional resins of low acid value which are easily dispersed in water by means of salt formation to form a dispersion of fine particle size despite the low acid value of the resin. In this way, electrodeposition is carried out more efficiently and easily, throwing power is improved, more resistive films are deposited and the films can be cured through the hydroxy functionality to form superior corrosion resistant coatings. The invention includes admixtures with water insoluble heat-hardening aminoplast resins which are compatible with the dispersed hydroxy-fuctional resins so that the deposition of the hydroxy-functional resin causes the simultaneous deposit of the aminoplast resin which aids in the curing reaction. More particularly, admixtures with certain benzoguanamine-formaldehyde resins are contemplated since these electrodeposit approximately proportional to the concentration of the respective resins in the deposition bath to enable the hydroxy-functional resins of the invention to be better cured by baking after electrodeposition.

Conventional electrodeposition processes are subject to numerous difficulties. Those resins which can be handled in the aqueous systems used are sensitive to water and to alkalis so that the film which is deposited, even after baking, lacks resistance to corrosion. This inadequate corrosion resistance persists despite the deposition and cure of curable systems, and when materials of the type of water-soluble or water-dispersible melamine-formaldehyde condensates are utilized for the cure, there has been difficulty in electrodepositing these together with the resin which is to be cured since the two resins are not transported to the anode at the same rate. Moreover, there is a tendency to deposit inadequately resistive films which build to excessive thickness, especially when higher deposition voltages are used in order to maximize the "throwing power" of the system. The term "throwing power" identifies the capacity of the system to deposit resin in locations which are remote from the cathode electrodes. The invention is also concerned with systems which can sustain high voltages without film breakdown in order to develop the desired throwing power. The capacity to operate at higher pH is also of interest to the throwing power of the system.

Another difficulty experienced in conventional electrodeposition baths is the fact that the amines used to solubilize the deposited resin accumulate in the electrodeposition bath to increase the pH thereof. Excessive alkalinity leads to less efficient electrodeposition and gassing with conventional solubilized resins which normally cannot be used on a practical basis at a pH above 8.4. The excess amine can be removed by dialysis or other technique, but this is wasteful. It is also possible to supply the water phase resin in its acid form to be dispersed in the alkaline electrodeposition bath where it can consume the accumulated amine. However, the usual hydrophobic resins used in electrocoating do not solubilize well and, in some instances, rather sophisticated mixing equipment is required. The hydrophylic resins which are used in the invention are very easily dispersed in aqueous alkaline medium. Thus, the acid resin or the resin in only partially neutralized condition can be supplied as an essentially water free solution in a water miscible organic solvent medium and is very easily dispersed in the alkaline electrodeposition bath. In this way, the amine concentration of the system is easily maintained within desired limits and, once the overall stoichiometry of the system has been determined, the pH of the bath can be largely ignored. Indeed, the system can be maintained using solids content as the sole point of reference.

In accordance with the invention, a hydrophylic hydroxy-functional resin of low acid value is dispersed in water in the form of a salt with a base, desirably a volatile nitrogenous base, to form a dipsersion of fine particle size despite the low acid value of the resin. Acid numbers of 70 or less are contemplated and the acidity is desirably minimized, e.g., the preferred materials have an acid number of less than 50, and preferably less than 30. In general, an acid number of at least about 8 is required and the most preferred materials have an acid number of from 12–25. As will be understood, acid numbers of this order of magnitude are less than is required to stably disperse the conventional hydrophobic resins which have previously been employed for electrodeposition.

Indeed, the preferred resins in accordance with the invention are linear resins having hydratable hydroxy groups positioned remote with respect to the linear polymer backbone, the acid number of the resin being insufficient to permit effective dispersion in water in the absence of the remotely positioned hydroxy groups.

The utilization of appropriate hydrophylic resins is easily noted by the achievement of dispersions of fine particle size despite the use of resins of low acid number. Thus, and with the conventional hydrophobic resins, an average particle size in the aqueous dispersion of less than 0.5 micron is not obtainable when the acid number of the resin is less than 70. In contrast, the average particle size utilized in the present invention is less than 0.5 micron and, as pointed out previously, this is achieved with resins of low acid value. Indeed and in the preferred practice of the invention, the average particle size is less than 0.1 micron and the acid number is desirably less than 50, and preferably less than 30.

It will be understood that while the resins of the invention are hydrophylic, they are poorly soluble in water per se and at least some salt formation is needed to provide adequate water dispersibility. Accordingly, electrodeposition applies a wet coating which is poorly soluble in water and which is routinely washed with water prior to baking.

The hydrophylic hydroxy-functional resins which may be used in accordance with the invention may be of various types. In one preferred form of the invention, a polyhydric polyether, preferably a polyhydric aliphatic polycyclic polyether is partially esterified with a monocarboxylic acid to provide an organic solvent-soluble hydroxy ester intermediate. This intermediate is then reacted with a polybasic acid anhydride such as trimellitic anhydride to provide carboxyl functionality without crosslinking the resin. This carboxyl-functional intermediate is then reacted with a monoepoxide to form an hydroxy ester of low acidity, preferably in the range of an acid number of from 12–25. The reaction with monoepoxide serves to eliminate undesirable acidity while, at the same time, providing reactive hydroxy groups which are removed from the polyether backbone. The reaction of the monoepoxide is preferably assisted by the presence of a small proportion of alkaline catalyst. The preferred alkaline materials are volatile, e.g., amines, but non-volatile bases such as sodium and potassium are usable and these can be removed from the deposited film, if desired, as by washing with phosphoric acid. The preferred catalysts are illustrated by tertiary amines or quaternary amine salts which are exemplified hereinafter. While larger amounts of amine can be used either as catalyst or by adding the same later, it is a feature of the invention to provide resins which can be utilized in the form of an essentially water base organic solvent solution of resin in water miscible organic solvent and which solutions can be easily and directly dispersed in the alkaline electrodeposition bath with the resin being present in its acid form and preferably containing only that proportion of alkaline material which was utilized as catalyst.

Referring more particularly to the polyhydric polyethers which are used in accordance with the invention, these can be of diverse type but, and from the standpoint of availability, the most usual materials of this character are epoxy resins in which linear polymer growth has produced secondary hydroxy groups spaced along the linear polyether structure. The epoxy group itself is viewed as a diol anhydride. The preferred materials are aliphatic in order to enhance affinity for water, but it is not essential that the entire polyether be aliphatic since linear polyethers based on glycidyl derivatives of aromatic compounds can be used, e.g., polymers of the diglycidyl ethers of bisphenols such as bisphenol A (the term bisphenol denotes a pair of phenolic groups linked together through a divalent aliphatic group). Preferred polyepoxides are based on an aliphatic backbone, e.g., ethylene glycol, propylene glycol, butylene glycol, diethylene glycol, dipropylene glycol, dibutylene glycol, and the like, these being typically in the form of glycidyl ethers. On the other hand, it is particularly preferred to employ aliphatic polycyclic polyethers, particular reference being made to a commercial material available from Union Carbide and identified by the trade designation "'Ucar' Polyol DCP–200." The formula and physical properties of this material are listed below:

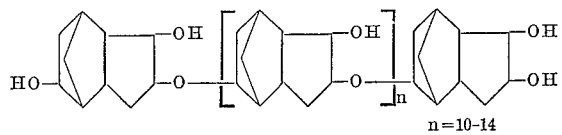

$n = 10$–$14$

Physical properties of "Ucar" Polyol DCP–200

Physical appearance—Light straw-colored solid
Softening point—170–200° C.
Hydroxyl, percent—11.4–12.2
Ester equivalent [1]—145
Solution viscosity in dimethyl formamide, 50 percent—150–225 cps.
Gardner color of a 50 percent solution in dimethyl formamide—7 max.
Specific gravity—1.22
Bulk density—42–43 lbs./cu. ft.
Non-volatiles, percent—98

Any organic compound containing a single carboxyl group and free of interfering functionality can be utilized to esterify a portion of the hydroxy groups present in the polyether. Preferably, a long chain acid is used which may be saturated or unsaturated but which is typically derived from an oil which may be a drying oil, a semi-drying oil or a non-drying oil. The specific nature of the esterifying monocarboxylic acid is of secondary consideration, but it functions to plasticize the resin, reduce its cost and reduce the functionality of the polyhydric compound.

Broadly speaking, one can utilize sufficient monocarboxylic acid to react with from 5–95% of the hydroxy groups which are available, but preferred practice is to use sufficient monocarboxylic acid to esterify from 20–80% of the hydroxy groups which are available. This initial esterification reaction is desirably carried to a low acid number, e.g., less than 10 since it is not advantageous to have free acid remaining in the reaction mixture.

The ester obtained in the first stage reaction of monocarboxylic acid with polyhydric polyether is then reacted with a polycarboxylic acid anhydride such as trimellitic anhydride. The point is that the acid selected should contain a single anhydride group and, preferably also, at least one further carboxylic acid group. As a result, the single anhydride group can react with at least a portion of the remaining hydroxy groups in the polyether to thereby generate a carboxyl group and with no danger of gelation since the single anhydride group will react easily under conditions under which the carboxyl group does not react rapidly. Using trimellitic anhydride as an illustration, the anhydride group reacts to bind the trimellitic moiety to the polyether and, for each such reaction, there are two carboxyl groups provided in the resin, one being the carboxyl group originally present in the trimellitic anhydride compound and the second being generated by reaction of the anhydride group.

In the manner indicated above, a resin is produced having a linear polyether backbone and carboxyl functionality which is available for reaction and which is spaced along the polymer chain. Desirably, the acid number provided after the reaction with the anhydride group has been completed is desirably at least 20 and more preferably at least 30, but acid numbers in excess of 100 are least preferred.

The carboxyl-functional material produced as aforesaid is then reacted with a monoepoxide to reduce the acidity and produce an hydroxy ester. Preferred practice of the invention reduces the acidity to the range of from 12–25, but at least some of the advantage of the invention is ---
[1] Grams required to esterify 1 gram mol weight of fatty acid.

achieved to the extent that the monoepoxide is used and to the extent that excessive acidity is consumed thereby. Acid numbers as high as 70 illustrate least preferred practice of the invention, but it is stressed that there are important features of the invention achieved at acid numbers less than 30 which cannot be practically duplicated at higher acid numbers. The reduced acid values relied upon in the present development not only provide coatings which are far less sensitive to water, but the conductivity of the film is reduced so that excessively thick films are not deposited and it is a feature of the new process to achieve adequate colloidal dispersibility in water with such a low acid number. The utilization of linear polyethers and the uniform distribution of the available hydroxy ester side groups derived from the reaction with monoepoxide, enables the small proportions of acid which are relied upon herein to provide adequate dispersion of the condensation product in aqueous medium using a base, such as organic amine or ammonia.

While monoepoxides are preferably used, since these are effective to reduce acidity and generate hydroxy groups remote from the polymer backbone with minimum danger of gelation, it will also be appreciated that small amounts of polyepoxide, e.g., a bisphenol-based diepoxide of low molecular weight can be used either alone or in admixture with the monoepoxide. However, the proportion of its use must be restricted to avoid gelation.

Referring to factors of secondary significance, typical monocarboxylic acids, e.g., fatty acids which may be used in accordance with the invention are illustrated by soya fatty acids, linseed fatty acids, castor oil fatty acids and the like. While the shorter chain acids such as hexoic acid are less preferred, they can be used.

While trimellitic anhydride is a preferred anhydride for use in the invention other anhydrides can be used such as maleic anhydride, succinic anhydride, acetic anhydride, propionic anhydride, phthalic anhydride, and hexahydrophthalic anhydride. A trifunctional monoanhydride which has been made available recently and which can be used is alpha-(2-carboxyethyl)-glutaric anhydride.

With respect to the monoepoxide used to generate hydroxy ester groups, any monoepoxide can be used which is free of functional groups which would interfere with the reaction between the carboxy-functional intermediate and the monoepoxide. The preferred monoepoxides are the $C_2$–$C_4$ monooxides such as ethylene oxide, propylene oxide, and butylene oxide. The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboylic acids and especially tertiary fatty acids in the form of a glycidyl ester are quite good and have been found to be of unique value in providing reactive hydroxy esters which are fully compatible with water and which help to provide desirable physical properties in the final resin product. These have the formula:

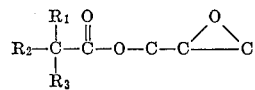

in which $R_1$ and $R_2$ are alkyl radicals having a chain length of from 2–18 carbon atoms and $R_3$ is the same as $R_1$ and $R_2$ or hydrogen. The compound in which $R_1$, $R_2$ and $R_3$ are all alkyl radicals containing from 9–11 carbon atoms is identified as tertiary glycidyl ester A and is used in some of the examples hereinafter.

Another class of resins which are desirably used in accordance with the invention are addition copolymers containing free hydroxy and carboxylic acid groups, a portion of the acid groups being preferably reacted with an epoxide, desirably a monoepoxide, in order to decrease the acidity of the polymer while, at the same time, providing reactive hydroxy sites which are remote from the polymer backbone. In order to conduct this reaction, the addition copolymer and the epoxide, in stoichiometric deficiency with respect to the carboxylic acid groups of the polymer, are placed in organic solvent solution in a water miscible organic solvent and the reaction is carried out in the presence of a basic catalyst, preferably a tertiary amine or a quaternary amine salt, to preferentially promote the reaction between the carboxy and epoxy groups. In this way, organic solvent solutions are provided which can be dispersed in water, the utilization of additional base being permissible in order to facilitate such dispersion.

It is to be observed that the addition copolymers may contain an hydroxy component, such as hydroxyethyl acrylate and these are reasonably hydrophylic without any reaction with monoepoxide, especially when the copolymer contains at least 10% of hydroxy component by weight. Accordingly, the copolymer as initially prepared may contain sufficient hydroxy functionality and appropriate acid content for use in the invention. Nonetheless, it is preferred for best distribution of monomers in the copolymer and to minimize cost to increase the proportion of hydroxy groups which are obtained by reaction with epoxide.

In this way, the hydratable hydroxy groups which have been generated remote from the linear polymer backbone by reaction with epoxide can be relied upon to enable fine particle size dispersion in water of low acid value resins. Again, the acid number should be less than 70, preferably less than 50, with the preferred materials having an acid number of less than 30, but more than about 8, the preferred materials having an acid number in the range of from 12–25.

Referring more particularly to the addition polymers which are utilized in accordance with the invention, the ethylenic materials which are utilized to form the addition polymer are of secondary consideration so long as sizable proportions of hydrophobic groups are avoided. In this respect methacrylates and aromatic compounds have poor water solubility properties and long chain esters are also hydrophobic, e.g., materials such as 2-ethylhexyl acrylate and the like. The bulk of the copolymer is desirably constituted by acrylate esters, containing from 1 to 4 carbon atoms in the ester groups, e.g., at leaest 70% by weight. The important components are those which supply hydroxy and carboxyl functionality since these are essential.

The hydroxy functionality may be supplied by 2-hydroxy ethyl acrylate, 2-hydroxy propyl acrylate, 2-hydroxy propyl butyl maleate, 2-hydroxy ethyl methacrylate, 2-hydroxy propyl methacrylate, 2-hydroxy methyl-5-norbornene, allyl alcohol, methallyl alcohol, 2-hydroxy ethyl crotonate, 2-hydroxy propyl crotonate, and crotyl alcohol.

Thus, and within the broad framework of the invention, any ethylenically unsaturated hydroxy-functional material may be utilized to provide the desired hydroxy functionality, equivalent proportions of from 4 to 40%, preferably from 10–25% being appropriate.

Correspondingly, any ethylenically unsaturated carboxy functional material may be used to provide the desired carboxyl functionality, these being typically illustrated by acrylic acid, methacrylic acid and crotonic acid. Other acidic materials which may be utilized are monobutyl maleate, itaconic acid, maleic acid, fumaric acid, and the like.

Appropriate proportions of the carboxyl-functional material in the addition polymer are illustrated by equivalent proportions of from 4–30%, preferably from 5–12%.

To illustrate other ethylenically unsaturated materials which may constitute the balance of the addition polymer, especial reference is made to monomers containing a single $CH_2=C<$ group, these being typically illustrated by methyl methacrylate, ethyl acrylate, isobutyl acrylate and short chain esters of other unsaturated acids, illustrated by diethyl fumarate, dimethyl maleate, ethyl crotonate and the like. Even vinyl aromatic compounds such as styrene are permissibly present though their proportion should be minimized.

The epoxide materials which may be employed may vary widely, but there are certain general considerations which should be kept in mind. First, while polyepoxides can be used, e.g., diepoxides, the proportion of use of such polyfunctional materials should be minimized to avoid cross-linking the system. Nonetheless, when the acidity of the addition polymer is minimized and when the proportion of polyepoxide is minimized, gelation can be avoided and valuable results achieved in accordance with the invention. Nonetheless, the preferred situation involves the use of monoepoxides since these permit the benficial results of the invention to be accentuated.

Second, the epoxide must be used in stoichiometric deficiency. This is because the reaction with the epoxide group is rapid and it is normally intended to consume substantially all of the epoxy reactivity which is present. In this way, stable compositions are produced which contain a residual acidity easily identified by the acid number of the product.

Preferably, the epoxide is used in a stoichiometric deficiency of at least 5%, preferably in a deficiency of from 50 to 90%. Stated in an opposite manner, one prefers to use the epoxy component in an amount sufficient to esterify (as by the formation of hydroxy ester groups) from 10 to 50% of the carboxyl groups which are available for esterification. The consumption of these carboxyl groups can be easily followed by observing the acid number of the product as it is reduced.

With the foregoing in mind, the polyepoxides which may be used in small amount instead of or in addition to the preferred monoepoxides are desirably diepoxides and these, in turn, are desirably polyethers of moderate molecular weight, e.g., from 400 to 2,000. Polyglycidyl ethers of polyhydric compounds are preferred, e.g., ethylene glycol or bisphenols such as bisphenol A.

With respect to the monoepoxides used to generate hydroxy ester groups, any monoepoxide can be used which is free of interfering functional groups. The preferred monoepoxides are the same as those described previously.

It will be observed that the selected resins are linear soluble resins (easily soluble in organic solvents such as the water miscible solvents noted) which possess a small acid number and hydroxy groups remote from the linear backbone of the resin to provide a hydrophylic resin which can be dispersed in small particle size in water with the aid of a base. These hydroxy groups are desirably provided by hydroxy ester groups and preferably provide an hydroxy number in excess of 30, most preferably at least 50.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio is substantially 0.4:1, though this ratio may vary from 0.1:1 to 1:1, with values of 0.3:1 to 0.5:1 being more usual. The only caution to be observed is to avoid those pigments which are unduly sensitive to water.

The acidic hydroxy esters of the invention can be cured by themselves, but a superior cure can be obtained in combination with aminoplast resins. The term "aminoplast resins" is a common one used to define heat-hardening condensation products of amines and especially triazines with excess formaldehyde. Condensation products of excess formaldehyde with melamine, benzoguanamine, and urea constitute typical aminoplast resins and the hydroxy esters of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in water soluble or water dispersible form and proportions of 1–40%, preferably 5–30%, based on total resin, are used to form films which cure more extensively and at lower temperature.

Unfortunately, and as is known, the simultaneous electrophoretic deposition of acidic resin soaps and aminoplast resins is difficult because the two different resins do not electrodeposit at the same rate. A feature of the invention is the finding that the low acid number hydroxyfunctional hydrophylic resins have an affinity for water insoluble aminoplast resins so that, when the hydroxyfunctional resins of the invention are electrodeposited, they carry with them the aminoplast resin which, and as is well known, enables a most desirable cure to be obtained between the methylol groups of the aminoplast resin and the hydroxy groups of the hydrophylic resin when the deposited coatings are baked to enable the curing reaction to take place. This simultaneous electrodeposition of hydrophylic hydroxy-functional resin and aminoplast resin having an affinity therefor is particularly preferred when the water insoluble heat-hardening aminoplast resins used are benzoguanamine-formaldehyde condensates which have been dispersed in the electrodeposition bath. With these resins, the electrodeposition is substantially proportional to the concentration of the respective resins in the electrodeposition bath.

Electrodeposition is particularly intended for the deposition of thin films, but the utilization of resins of higher acidity as is typical in the prior art provides a more conductive deposit and the film thickness tends to build undesirably. The materials of lower acid number used in the invention enable thinner films to be produced at the high voltages which are preferred. Moreover, the water insoluble aminoplast resins which are used, e.g., the benzoguanamine-formaldehyde condensates which are preferred, enable a further reduction in film thickness and the films which are deposited outstandingly resist breakdown at high voltage whether an aminoplast component is included or not. Apparently, those aminoplast resins which have sufficient affinity for water to permit them to be dispersed without a hydrophylic resin increase film conductivity and transport can be quite poor. In the invention, the water insoluble aminoplast is forced to follow the hydrophylic resin because of its lack of affinity for water and, this same lack of affinity for the conductive amine-containing aqueous phase of the electrocoating system minimizes the conductivity of the films which are deposited. Interestingly, the deposited wet films only contain about 0.2% by weight of amine and 0.1–0.2% by weight of water miscible solvent.

As previously indicated, the hydrophylic resins of the invention are desirably supplied in the form of a solution in the water miscible organic solvent, these being preferably used in an amount of at least 12% by weight, desirably at least 20% by weight of water miscible organic solvent, based on the weight of the resins which are dispersed in the water phase. The preferred solvents are: dioxane, ethanol, isopropanol, 2-ethoxy ethanol, methyl ethyl ketone, 2-ethoxy ethanol acetate, propyl alcohol, butoxy ethanol, 2-ethoxy diethylene glycol, 2-butoxy diethylene glycol, etc.

The specific nature of the nitrogenous base which is selected to aid solubility is not a primary feature of the invention. Ammonia is a useful nitrogenous base, but aliphatic amines are preferred. These aliphatic amines are illustrated by monomethyl amine, dimethyl amine, diethyl amine, triethyl amine and morpholine. The proportion of the nitrogenous base is determined by the pH which is desired in the electrodeposition bath.

As previously indicated, the aqueous colloidal dispersions of the invention are intended to be applied by electrodeposition. While these aqueous systems can be applied directly as by spraying or roller coating, they are preferably used in an electrodeposition process in which a unidirectional electrical current is passed through the bath to cause deposition on the anode. For such purpose, the colloidal dispersion is preferably formulated to contain 5–15% solids content in water. The pH of the bath can vary widely, e.g., from a pH of 6 or higher. As previously indicated, the prior art use of hydrophobic resins which are dispersed in water through salt formation has been restricted to a pH not in excess of 8.4 whereas, the invention permits the deposition bath to function at higher pH which is helpful to the throwing power of the system. However, one of the main factors which limits throwing power is the voltage used for electrodeposition. The higher the voltage, the better the throwing power. On the other hand, the maximum voltage which can be tolerated is limited by the conductivity of the film which is deposited. The films deposited by the invention are more highly resistive and better resist gassing at high voltage. This increased resistivity to gassing persists when a pH above 8.4 is used so that throwing power can be effectively increased either by the utilization of higher voltage or by the utilization of high pH or both.

Indeed, the invention performs especially well at a pH of 8.5 and higher, a pH of up to about 10 being practical, but preferably less than 9.6. Best results are obtained at pH 8.6–9.4. Normally, the use of a pH above 8.4 results in a gross loss in operating efficiency. In contrast, a change in pH of from 8.0 to 9.0 in the invention results in only a 29% reduction in electrical efficiency, e.g., from 48 to 58 coulombs per gram at voltages of from 100 to 150 volts, an insignificant decrease. However, throwing power is markedly increased at pH 9 in comparison with pH 8, a considerable advantage. Moreover, in the prior art, electrodeposition from solution systems at a pH above 8.4 caused gassing, especially at the higher voltages. In the invention, gassing has not been a problem at a pH up to about pH 10.6, above which some difficulty was encountered.

As a matter of curious interest, the solution systems of the invention deposit thinner and more resistive films at higher pH, a most surprising result.

It should be kept in mind that "throwing power" is of greater importance when the object to be coated includes deep recesses, but the capacity to sustain high voltage without gassing is important to productivity regardless of the shape of the object. The invention especially contemplates the use of at least 200 volts, preferably at least 250 volts which were not satisfactory in the prior art, but which enhance throwing power and rate of resin deposition.

The preferred water insoluble aminoplast resins are based on benzoguanamine. These are heat-hardening water insoluble condensates of benzoguanamine with a stoichiometric excess of formaldehyde and are, per se, well known. While these do not disperse well in water, per se, they do disperse in the presence of the hydrophylic resins of this invention in water soluble salt form. Conveniently, the benzoguanamine resin is dissolved in the solvent solution of acidic resin (regardless of the presence or absence of base) in water miscible solvent which is added to the aqueous alkaline electrodeposition bath. As a result, the benzoguanamine resin is stably dispersed in the bath by simple mixing. An appropriate commercially available water insoluble heat-hardening benzoguanamine-formaldehyde resin is Uformite QR–336, a product of Rhom & Haas Company. Surprisingly, the two resins may be electrically transported together and without either of the resins significantly building up or becoming depleted in the electrophoretic bath.

The films deposited in accordance with the invention are baked to cure the same. In the absence of an aminoplast resin, baking temperatures of approximately 350° F. and higher are desirably used in order to achieve a measure of cure by reaction between the carboxyl and hydroxy functionalities present in the resin. The hydroxy groups may also condense with one another in the presence of the carboxyl groups. In the presence of an aminoplast resin, the baking temperatures which may be used are lowered and a more extensive cure is possible. Appropriate baking temperatures are from 200–500° F. for periods varying from about 30 seconds at the highest baking temperatures to about an hour at the lowest temperatures.

As will be gathered from the discussion presented hereinbefore, the preferred resins have an acid number of from 12–25 and contain very little amine and these easily form colloidal dispersions in water by simply mixing in a solution of the resin in water miscible solvent. These dispersions which are close to true solutions electrodeposit excellently and the deposited films are resistive and do not break down at high deposition voltages. Moreover, these aqueous systems are easily formed and stable and may be applied at low or high pH, but are especially useful at a pH above 8.5 where better throwing power and more resistive films are obtained at the sacrifice of very little electrical efficiency.

As will be appreciated, the invention can be carried out using resins of diverse chemical constitution and it may be helpful to include a discussion of various aspects of the production of various resins to assist understanding.

With respect to the production of the resins which are utilized in the invention, it is important that these include significant hydroxy functionality in order to enhance reactivity and capacity for dispersion in water with the aid of amine or other base despite the presence of only small amounts of acid in the polymer. For this purpose, and since epoxides are reactive with both hydroxy groups and carboxylic acid groups, it is important that the epoxide reaction be conducted preferentially so as to consume the excess acidity which is undesired without impairing the hydroxy functionality which is desired. This selective reaction is achieved through the utilization of an alkaline esterification catalyst. Preferred catalysts are tertiary amines such as triethyl amine and quaternary ammonium salts such as trimethyl benzyl ammonium chloride. These alkaline materials are reactive with the acid groups of the polymer and appear to remain associated as salts with the residual carboxyl functionality of the resin.

The reaction is desirably carried out at moderately elevated temperatures in solution in a water miscible organic solvent. While complete water miscibility is not required, some extensive miscibility is needed, e.g., considerably in excess of the very limited miscibility of butyl alcohol in water. Appropriate water miscible organic solvents are the same as those noted previously in connection with the solvent solutions of resins which are used. All of these are excellent solvents for hydroxy-functional resins, alcohols being preferred from the standpoint of solubility. On the other hand, it is desired to point out that methyl ethyl ketone is an excellent solvent for resins and it does possess sufficient solubility in water to be used so long as the proportion of ketone does not exclude its solubility in the electrodeposition bath. Moreover, methyl ethyl ketone has valuable properties and is helpful when high voltages are contemplated.

When using the preferred alcoholic solvents, it will be appreciated that the capacity to selectively react the epoxy group with the carboxylic acid groups is of the utmost importance for, otherwise, the epoxy groups would react with the hydroxy groups of the solvent.

When we consider the reaction which takes place in greater detail, it will be recognized that the epoxy compound reacts with the carboxylic acid groups of the polymer by addition, such reaction taking place with reasonable rapidity at moderately elevated temperatures at which condensation does not take place. This is what permits extensive reaction with monoepoxide without gelation. When polyepoxides are used, the proportion thereof must be minimized and the reaction watched more carefully to be certain that the reaction is terminated before the system gels. Thus, one need merely heat the mixture until the acidity of the system is lowered while avoiding such excessive temperatures as will cause condensation to take place. Appropriate temperatures are in the range of from 150° F. to 350° F. A temperature of about 200–300° F. is particularly appropriate because the reaction with epoxide is reasonably rapid and there is little tendency for any condensation reaction.

Referring to the utilization of polyhydric polyethers, preferred proportions are illustrated as follows.

First, approximately half of the hydroxy functionality of the polyhydric polyether is consumed, e.g., from 30–70%. The hydroxy functionality which remains is then reacted with the anhydride component in an amount to provide a carboxyl functionality which is approximately equal to the remaining hydroxy functionality. Again, approximate equality is intended to identify a variation of ±20%. This can be illustrated using one mole of trimellitic anhydride for every 3 moles of residual hydroxy functionality available for reaction therewith. In this way, the one mole of trimellitic anhydride generates two equivalents of carboxyl functionality while consuming one of the three available hydroxy functionalities to leave two thereof. The product so obtained is then reacted with the monoepoxide, preferably in an amount to consume at least 50% of the carboxyl groups which are available. In this way, a final product is obtained of low acid number and possessing a relatively high hydroxy functionality.

Another way to view proportions is on an overall basis, e.g., to total the hydroxy functionality derived from the polyether and from the monoepoxide and to total the carboxyl functionality derived from the fatty acids and the anhydride. On the basis of total functionality, the invention desirably uses an excess of hydroxy functionality, e.g., an excess of from 5 to 100%, preferably from 10% to 50%.

Preferred resins are dispersible in water to provide adequate stability for continuous electrodeposition when the resin is only partially satisfied with base. For this purpose, it is preferred to employ a resin with a higher hydroxy functionality, preferred hydroxy functionalities being in excess of 15.

When the resin relied upon employs an epoxy resin as the polyhydric polyether under consideration, the preferred proportions would be somewhat different particularly from the standpoint of minimizing the poportion of monocarboxylic acid which is employed. In this form of the invention, and using the typical diglycidyl ethers of a bisphenol, these may have an epoxide equivalent weight of from about 150 to 2,000, e.g., a diglycidyl ether of bisphenol A having an epoxide equivalent weight of 525 and a molecular weight of 1,050. These epoxy resins are first reacted with sufficient fatty acid to provide at least one equivalent of acid per equivalent of epoxy so that all of the epoxy functionality is consumed, an alkaline catalyst being useful to speed the acid-epoxide reaction. Up to a 50% stoichiometric excess of acid can be used in preferred practice, but the excess should be minimized. In this way, secondary hydroxy groups are generated by reaction and a good portion of the hydroxy groups initially present are preserved. The product is then reacted with anhydride, such as trimellitic anhydride, to generate an acid value desirably in excess of 40, and preferably over 70. Lastly, monoepoxide is used to decrease acidity as previously discussed and to provide compatibility with water as low acid value through the generation of hydroxy groups remote from the linear backbone of the epoxy resin.

The invention is illustrated in the examples which follow.

EXAMPLE 1.—PREPARATION OF RESIN "A"

| Parts by wt. | | |
|---|---|---|
| 1,946 | Polyhydric polyether—UCAR Polyol DCP-200 (hydroxyl percent, 12%) (ester equivalent, 145). | Charge into reactor. Heat to 215° C. Set Dean-Stark trap and distill off water of esterification. Hold for acid value of 4 to 6. Distill off xylol. Cool to 90° C. Add: |
| 1,834 | Soya fatty acids | |
| 60 | Xylol (reflux) | |
| 220 | Trimellitic anhydride | Reheat to 100–110° C. and hold for acid value of 35–38. |
| 400 | Methyl ethyl ketone | |
| 800 | Methyl ethyl ketone | Add. Reheat to 90° C. |
| 53 | Triethyl amine | |
| 115 | Butylene oxide | Add from addition funnel over 30 minutes. Hold for acid value of 24–26. Cool to room temperature. |

Final characteristics of hydroxy ester

Solids (percent) _____ 78.2
Viscosity _____ X–Y
Acid value _____ 25.1

Coating procedure

The coating operation is performed in a metal tank, which is equipped with a recirculating pump and a thermometer. The tank serves as a cathode and zinc phosphate treated steel panels or aluminum panels are utilized as the anodes.

The volume of the bath is 2 liters. Direct current is imposed on the metal container (cathode) and on the panels (anode) from an external circuit. Panels four inches wide and eight inches dipped length are used as the anodes for coating.

The voltage across the bath is run up from zero to the voltage desired (maximum of 550 volts) during panel coating to deposit a film, before electrical resistance of the film virtually stops deposition at the maximum voltage used. The deposited film, even before baking, is water resistant, slightly tacky and has very good adhesion to metal. The current details are tabulated hereinafter.

The product of Example 1 is partially amine satisfied and will disperse in water without additional amine. Additional amine enhances stability for continuous operation and is used in the formulations which follow. However, the partially neutralized acidic product can be dispersed in water to form an aqueous concentrate having a resin solids content of from 25–60% and this aqueous concentrate can be used directly to replenish the solids consumed by electrodeposition to prevent the build up of base in the bath.

After baking for 20 minutes at 400° F., the films cure to a solvent resistant, pore free hard and flexible coating.

Formulations for electrocoating

A clear formulation, using polyester resin "A," is made by thoroughly mixing:

| (1) | Parts |
|---|---|
| Polyester resin "A" | 100.0 |
| Triethyl amine | 4.5 |
| Deionized water | 845.5 |
| | 950.0 |

The above formulation has a solids content of approximately 8% and is subjected to a direct current at various potentials from 50 to 350 volts to provide the results tabulated hereinafter.

Clear formulations using polyether resin "A" and various aminoplast resins are as follows:

| (2) | Parts |
|---|---|
| Polyether resin "A" | 120.0 |
| Benzoguanamine resin (see note 1) 70% non-volatile solids | 14.3 |
| Triethyl amine | 5.4 |
| Deionized water | 860.3 |
| | 1000.0 |

(3)

| | |
|---|---|
| Polyether resin "A" | 107.0 |
| Benzoguanamine resin (see note 1) 70% non-volatile solids | 28.5 |
| Triethyl amine | 4.8 |
| Deionized water | 859.7 |
| | 1000.0 |

(4)

| | |
|---|---|
| Polyether resin "A" | 93.3 |
| Benzoguanamine resin (see note 1) 70% non-volatile solids | 42.8 |
| Triethyl amine | 4.2 |
| Deionized water | 859.7 |
| | 1000.0 |

(5)

| | |
|---|---|
| Polyether resin "A" | 120.0 |
| Melamine resin (see note 2) | 10.0 |
| Triethyl amine | 5.4 |
| Deionized water | 864.6 |
| | 1000.0 |

(6)

| | |
|---|---|
| Polyether resin "A" | 107.0 |
| Melamine resin (see note 2) | 20.0 |
| Triethyl amine | 4.8 |
| Deionized water | 865.2 |
| | 1000.0 |

(7)

| | |
|---|---|
| Polyether resin "A" | 93.3 |
| Melamine resin (see note 2) | 30.0 |
| Triethyl amine | 4.2 |
| Deionized water | 872.8 |
| | 1000.0 |

Vigorous agitation is used when the water and amine are added to the resin components of Formulations 1–7 to provide baths containing 10% non-volatile solids which are electrodeposited at potentials of from 100 to 250 volts. The properties of the coatings obtained and other factors regarding the electrodeposition are tabulated below.

simultaneous deposit with the acidic resin in the electrodeposition bath, the specific film resistances obtained utilizing the invention are much higher than those normally obtained and, especially when the benzoguanamine resin is used instead of the melamine resin. First, the low acid number of the resins used in the invention and the capacity of the resin per se to resist 250 volts speaks for itself. Moreover, and using proportions of benzoguanamine-formaldehyde resin in the range of from 10–30%, the specific film resistance ranges from about 9,000 to about 12,000. In contrast, and with the melamine resin, the specific film resistance is about 6,000 at the 10% concentration level and is reduced progressively to approximately 1,000 at the 25% level. As will be suspected, from the film resistances indicated, the rupture voltages in the invention are quite good, e.g., the rupture voltage in the absence of the benzoguanamine-formaldehyde condensate is 250 volts and, when approximately 20% of the benzoguanamine resin as measured by nitrogen analysis, almost to 325+ volts. This high rupture voltage persists at the 30% benzoguanamine-formaldehyde level. In contrast, when the melamine resin level is increased above about 10%, the rupture voltage falls so that, at about 25% melamine resin content, the rupture voltage is reduced to 150 volts.

In order to establish the relative rate of migration, 80 parts of Polyether Resin "A" are blended in a first trial with 20 parts of the benzoguanamine resin; in a second trial with 20 parts of the dispersed melamine resin noted above; and in a third trial with a water-soluble melamine-formaldehyde condensate (hexamethoxymethyl melamine—Cymel 300). Utilizing the benzoguanamine resin, the electrodeposited film contains 19.8% of the benzoguanamine resin as measured by nitrogen analysis, almost an exact match for the concentration in the bath. However, utilizing the melamine resin in dispersed form, only 14.4% of the melamine resin is present in the electrodeposited film Utilizing the water-soluble melamine resin (Cymel 300) only 5.5% of the melamine resin is present in the electrodeposited film.

It is pointed out that the triethyl amine in Example 1 functions both as a basic catalyst which fosters the reaction of the monoepoxide with the carboxyl groups of the resin, and it may also provide some soap forming quali-

| Formulations | 1 | 2 | 3 | 4 | 5 | 6 | 7 |
|---|---|---|---|---|---|---|---|
| Coulombs/gram | 46 | 44 | 38 | 32 | 40 | 36 | 32 |
| Amps/sq. ft | 1.3 | 1.2 | 1.0 | .86 | .9 | 1.3 | 1.9 |
| Specific film resistance | 6,186 | 8,959 | 12,671 | 10,542 | 7,576 | 3,031 | 1,085 |
| Detergent resistance * | 6D | 8M | 8F | 8F++ | 8M | 6D | 6VF |
| Solvent resistance | Soften OK | OK | OK | OK | OK | OK | OK |
| Flexibility (conical mandrel) | OK | OK | OK | ¾″ | ½″ | ¾″ | ¾″ |
| Impact-direct (in./lbs.) | 40 | 30 | 20 | 10 | 20 | 20 | 10 |
| Rupture voltage | 250 | 250 | 325+ | 325+ | 250 | 200 | 150 |

\* Detergent resistance is determined by a commercially used test in which the density and size of the blisters which are produced by 48 hour immersion in 1% aqueous Tide solution are used to indicate commercial acceptance. The results are reported by combinations of numbers and letters. The numeral 6 identifies medium size blisters whereas the numeral 8 identifies small blisters. The letters VF identify very few blisters and F identifies a few blisters, F++ being intermediate F and VF. M identifies a moderate blister density and D a high blister density.

NOTE 1.—The benzoguanamine resin utilized is a water-insoluble, heat-hardening condensate of benzoguanamine with a stoichiometric excess of formaldehyde. The product is produced by reacting 750 grams of n-butyl Formcel (40% formaldehyde, 51.5% n-butanol and 8.5% water), 630 grams benzoguanamine, and 412 additional grams of n-butanol. The mixture is heated with agitation to 195–200° F. which is maintained for 10–15 minutes until all of the benzoguanamine has dissolved. The pH is adjusted to 4.3–4.5 using a 10% aqueous formic acid solution (approximately 50 milliliters are needed). The temperature is then raised to 203–206° F. to distill n-butanol which is returned as reflux until water (not returned) is no longer generated. After water is no longer generated, butanol is collected in an amount equal to the volume of water which had been collected. The product is then thinned with 310 grams xylene and 135 grams n-butanol and is filtered and then adjusted to 60% nonvolatile solids using a 50/50 weight ratio mixture of xylene and n-butanol. If desired, comparable results can be obtained by utilizing in place of the benzoguanamine resin condensate described above, the commercial material Uformite QR-336 (Rohm & Haas).

NOTE 2.—The melamine resin utilized is a heat-hardening melamine-formaldehyde condensate commercially available from American Cyanamid under the trade designation XM-1116 and which is specifically recommended by them for use in electropainting.

Comparing the benzoguanamine-formaldehyde condensates of the invention with typical melamine-formaldehyde condensates which are water dispersible in the absence of a hydrophylic resin to aid dispersion and which have been used in the painting art in an effort to obtain ties, but catalytic properties are primarily utilized in Example 1. It is to be noted that the reaction temperature is such that amine losses can be expected.

The proportion of alkaline esterification catalyst which is utilized is of secondary consideration so long as sufficient is used to promote the desired esterification reaction and the production of the hydroxy ester.

EXAMPLE 2.—PREPARATION OF HYDROXY POLYMER UTILIZING GLYCIDYL ESTER OF SATURATED TERTIARY ACID

Parts by wt.

| | | |
|---|---|---|
| 1,174 | Polyhydric Polyether (same as in Example 1). | Charge into reactor. Heat to 210° C. Set Dean-Stark trap filled with Xylol. Remove water of esterification using azeotropic distillation. Hold for Acid Value of 4 to 6. Distill off Xylol and cool to 90° C. |
| 1,106 | Soya Fatty Acids | |
| 30 | Xylol (reflux) | |
| 265 | Trimellitic Anhydride | Add. Reheat to 100-110° C. and hold for Acid Value of 60-70. |
| 241 | Methyl Ethyl Ketone | |
| 483 | Methyl Ethyl Ketone | Add. Reheat to 90° C. |
| 64 | Triethyl Amine | |
| 473 | Tertiary Glycidyl Ester A (Epoxide Equivalent: 240). | Add monoepoxide from a separatory funnel over 30 minutes. Hold for Acid Value of 19-21. |

Final characteristics of the resin are as follows:

Solids (percent) _____ 75
Viscosity (Gardner) _____ V–W
Acid value _____ 21

The above resin is formulated into a clear aqueous bath containing 10% non-volatile solids using 4.5 parts of triethyl amine per 100 parts of polyether resin as in Example 1. Eighty percent of these solids are the hydroxy condensation polymer and the other 20% are the benzoguanamine resin identified in Note 1 of Example 1. Upon electrodeposition utilizing a direct current having a potential of from 30–350 volts, coatings of excellent properties are deposited and film rupturing is not encountered, even with the highest voltage named.

EXAMPLE 3

Preparation of water soluble condensation resin utilizing saturated, non-oxidizing type acids Parts by wt.
Polyhydric polyether (same as in Example 1) ____ 1,174
Stearic acid _____ 1,106
Xylol (reflux) _____ 20
Trimellitic anhydride _____ 132
Methyl ethyl ketone _____ 240
Methyl ethyl ketone _____ 272
Triethyl amine _____ 25
Butylene oxide _____ 68

The above materials are reacted in accordance with the same procedure reported in Example 2 to provide a final resin solution having the following characteristics:

Solids (percent) _____ 81
Viscosity (Gardner) _____ $Z_2$–$Z_3$
Acid value _____ 18

The properties of coatings electodeposited from an aqueous bath containing the resin produced in the present example are approximately the same as those provided in Example 2.

EXAMPLE 4

Parts by wt.

| | | |
|---|---|---|
| 1,174 | Polyhydric Polyether (same as in Example 1). | Charge into reactor. Heat to 210-215° C. Set Dean-Stark trap and distill off water of esterification. Hold for Acid Value of 4 to 6. Distill off Xylol and cool to 90° C. |
| 1,106 | Soya Fatty Acids | |
| 30 | Xylol (reflux) | |
| 265 | Trimellitic Anhydride | Add. Reheat to 100-110° C. and hold for Acid Value of 65-70. |
| 241 | Methyl Ethyl Ketone | |
| 483 | Methyl Ethyl Ketone | Add Methyl Ethyl Ketone and Triethyl Amine. Reheat to 90° C. Add Butylene Oxide from separatory funnel over 30 minutes. Hold for Acid Value of 19-21. Cool to room temperature. |
| 64 | Triethyl Amine | |
| 139 | Butylene Oxide | |

Final characteristics of hydroxy ester are as follows:

Solids (percent) _____ 73.9
Viscosity (Gardner) _____ W–X
Acid value _____ 21.5

The above resin is formulated into a clear aqueous bath containing 8% non-volatile solids, 80% of the solids being the hydroxy condensation polymer and the other 20% being the benzoguanamine resin identified in Note 1 of Example 1. Upon electrodeposition utilizing a direct current having a potential of from 30–350 volts, coatings of excellent properties are deposited and film rupturing is not encountered, even with the highest voltage named. Interestingly, no additional amine is needed to dissolve the resin of the present example, the triethyl amine used as catalyst providing a pH of 7.45 at a solids content of 8%.

The present example serves to point up the capacity of the benzoguanamine resin to control film thickness.

First, and utilizing the 80/20 resin mixture of Example 4, the following film thicknesses were obtained by varying the voltage from 50–325 volts:

| Voltage: | Film thickness (mils) |
|---|---|
| 50 | .1 |
| 100 | .25 |
| 150 | .55 |
| 325 | .85 |

Repeating the foregoing, but utilizing a 70/30 weight ratio mixture instead of an 80/20 mixture so as to employ an increased proportion of benzoguanamine resin (a small amount of triethyl amine is added to better accommodate the larger proportion of benzoguanamine resin at a pH of 8.25), the following film thicknesses are deposited:

| Voltage: | Film thickness (mils) |
|---|---|
| 50 | .1 |
| 100 | .22 |
| 150 | .28 |
| 200 | .38 |
| 250 | .42 |
| 325 | .50 |

As will be understood, the voltage is in good measure determined by the throwing power desired consistent with the rupture resistance of the resins used. On the other hand, and when the thicker films are not desired; an increased proportion of benzoguanamine resin in accordance with the invention will serve this function.

To illustrate how conventional melamine-formaldehyde resins alter the situation, in place of the 80/20 weight ratio mixture noted hereinbefore, an 80/15/5 weight ratio mixture is employed, 5 parts of the benzoguanamine resin being replaced by 5 parts of the dispersed melamine resin of Example 1, Note 2. No additional triethyl amine was needed and the aqueous bath contained 10% solids at a pH of 6.95. The following film thicknesses are deposited:

| Voltage: | Film thickness (mils) |
|---|---|
| 50 | .12 |
| 100 | .26 |
| 150 | .45 |
| 200 | .85 |
| 250 | 1.0 |
| 325 | 1.1 |

To further illustrate the use of conventional melamine-formaldehyde resins, an 80/20 weight ratio mixture is utilized, with the 20 parts being entirely constituted by the dispersed melamine resin of Example 1, Note 2. The following film thicknesses are deposited:

| Voltage: | Film thickness (mils) |
|---|---|
| 50 | 1.15 |
| 100 | 2.3 |
| 150 | 3.55 |
| 325 | (¹) |

¹ Extremely heavy layer—flows off the vertical panel.

It should also be observed that the reaction with trimellitic anhydride produces a product having an acid value in the range of 65–70. A specimen of this intermediate product having an acid value of 69 is removed and used as a control. Films of this intermediate product and also of the final product of the present Example 4 are drawn down on tinplate using a 3 mil draw down bar. The films so produced are baked for 20 minutes at 325° F. and then cooled to room temperature and immersed in 1% potassium hydroxide solution in order to test the chemical resistance of the product. The following results were obtained.

Example 4 (intermediate):

Acid intermediate
(Before reacting with epoxide).

Acid value: 69

Baked 30 minutes at 325° F.

Complete disintegration: Film removed from the panel after 24 hours immersion in 1% KOH. Very poor alkali resistance.

Example 4 (final):

Final hydroxy product.
(After reacting with epoxide).

Acid value: 21.5.

Baked 30 minutes at 325° F.

No effect after 24 hour immersion in 1% KOH solution. Film continuous and adherent.

As will be seen from the foregoing, the reaction with monoepoxide reduces the acidity and increases the capacity for cure to an alkali-resistant finish. Residual unconsumed acidity in the cured product also leads to failure when coated panels are tested for salt spray or detergent resistance as well as resistance to destruction in dilute caustic solution.

It is to be noted that the volatility of the base which is used to solubilize the polycarboxylic resin is primarily of significance when the molecules which are electrodeposited are associated with a significant proportion of residual base which must be removed when the coating is baked. The problem of removing base by volatilization is particularly important whenever the resin used has a high acid number with a plurality of the acid groups being neutralized as evidenced by a high bath pH. By using resins which are water dispersible at low acid number as in the invention, very little base is deposited in the film and one can choose to tolerate such small amounts of foreign material in the final film. The point is to minimize the amount of base which is deposited and thereby minimize the amine which is wasted and enable the use of a non-volatile base. Also, any residual base included in the deposited film increases the conductivity of the film and this leads to the deposit of excessive film thicknesses and to the decreased resistance to rupture of the film at high deposition voltage. Both of these disadvantages are minimized in the invention.

As electrodeposition proceeds in the present invention utilizing the 8% solids aqueous bath containing an 80/20 weight ratio mixture of the hydroxy condensate polymer with the benzoguanamine resin, the solids content of the bath is decreased. These solids can be replenished by adding to the bath an appropriate proportion necessary to restore the 8% solids content of the same aqueous bath composition used initially but with the exception that it is more concentrated, e.g., containing 20% nonvolatile solids. It is stressed that the resin solution of the present Example 4 is directly dispersible in water without the utilization of any additional base so that the replenishment solution can be directly formulated in any desired concentration, e.g., it can be used as an essentially water-free feed solution.

EXAMPLE 5

| Parts by wt. | | |
|---|---|---|
| 1,267 | Epoxy Resin (Diglycidyl Ether of bisphenol A—Epoxide Equivalent: 525). | Charge into reactor. Heat to 220° C. using nitrogen sparge. Hold for Acid Value of 4 to 6. |
| 947 | Tall Oil Fatty Acids | |
| 1 | Triethyl Amine | |
| 10 | Xylol | |
| | | Cool to 150° C. |
| 343 | Trimellitic Anhydride | Add. Hold for Acid Value of 84–87. |
| 446 | Methyl Ethyl Ketone | Add. Cool to 95° C. |
| 26.5 | Triethyl Amine | Hold at 95–100° C. for Acid Value of 18–20. |
| 201 | Butylene Oxide | |

Final characteristics of the polymer are as follows:

Solids (percent) _____ 83.6
Viscosity (Gardner) _____ Z₄⁺
Acid value _____ 18.8

EXAMPLE 6

| Parts by wt. | | |
|---|---|---|
| 500 | Dioxane | Charge into reactor equipped with an agitator, thermometer, reflux condenser and nitrogen inlet tube. Heat to 200° F. |
| 500 | Dioxane | |
| 600 | Isobutyl Acrylate | |
| 100 | Styrene | Premix and add to reactor over 2¼ hour period at 230° F. Hold for one hour. |
| 760 | Ethyl acrylate | |
| 400 | Hydroxy Ethyl Acrylate | |
| 140 | Acrylic Acid | |
| 40 | Benzoyl Peroxide | |
| 6 | do | Add. Hold for 2 hours at 230° F. |
| 6 | do | Add. Hold for additional 2 hours to complete monomer conversion. (Acid value at this point=53). |
| 15 | Triethyl Amine | Add. Hold for 15 minutes. |
| 129 | Glycidyl Ester of Versatic Acid (Tertiary Glycidyl Ester A—Epoxide Equivalent: 240). | Add. Hold for 2 hours. |

Final characteristics of the polymer are as follows:

Solids (percent) _____ 64.7
Viscosity (Gardner) _____ Z₄
Color (Gardner-Holdt) _____ 1–2
Acid value _____ 41

Coating procedure

The coating operation is performed in a metal tank, which is equipped with a recirculating pump and a thermometer. The tank serves as a cathode and zinc phosphate treated steel panels are utilized as the anodes.

The volume of the bath is two liters. Direct current is imposed on the metal container (cathode) and on the steel panels (anode) from an external circuit. Steel panels 4 inches wide and 8 inches dipped length are used as anodes for coating.

Coating conditions

The voltage across the bath is run up from zero to a maximum of 400 volts during panel coatings to deposit a film, before electrical resistance of the film virtually stops deposition at the maximum voltage used. The deposited film, even before baking, is water resistant, slightly tacky and has very good adhesion to metal.

After baking for 20 minutes at 400° F., the film cures to solvent resistant, pore free, hard and flexible coating.

Formulations for electrocoating

A clear formulation using the heat-hardening resin of Example 6 to form the aqueous bath used for electrodeposition is as follows:

| Formulations | 1 | 2 | 3 | 4 | 5 | 6 | 7 |
|---|---|---|---|---|---|---|---|
| Coulombs/gram | 56 | 77 | 68 | 57 | 82 | 71 | 64 |
| Amps/sq. ft | 1.7 | 2.4 | 2.1 | 1.4 | 2.5 | 3.8 | 3.7 |
| Specific film resistance (ohms) | 4,865 | 5,140 | 4,893 | 6,295 | 3,361 | 1,868 | 1,215 |
| Flexibility (conical mandrel) | OK | OK | OK | OK | OK | OK | OK |
| Impact-direct (in./lbs.) | 80 | 80 | 80 | 80 | 80 | 50 | 20 |
| Rupture voltage | 325+ | 325+ | 325+ | 325+ | 325+ | 325+ | 325+ |

(1)

| | Parts |
|---|---|
| Heat-hardening resin solution of Example 6 | 154 |
| Triethyl amine | 7.9 |
| Deionized water | 838.1 |
| | 1000 |

Clear formulations using the heat-hardening resin of Example 6 and an aminoplast resin are as follows:

(2)

| | Parts |
|---|---|
| Heat-hardening resin solution of Example 6 | 138 |
| Benzoguanamine resin (see Note 1 of Example 1) 70% non-volatile solids | 14.3 |
| Triethyl amine | 7 |
| Deionized water | 840.9 |
| | 1000 |

(3)

| | |
|---|---|
| Heat-heardening resin solution of Example 6 | 123 |
| Benzoguanamine resin (see Note 1 of Example 1) 70% non-volatile solids | 28.6 |
| Triethyl amine | 6.3 |
| Deionized water | 842.1 |
| | 1000 |

(4)

| | |
|---|---|
| Heat-hardening resin solution of Example 6 | 108 |
| Benzoguanamine resin (see Note 1 of Example 1) 70% non-volatile solids | 42.8 |
| Triethyl amine | 5.5 |
| Deionized water | 843.7 |
| | 1000 |

(5)

| | |
|---|---|
| Heat-hardening resin solution of Example 6 | 138 |
| Melamine resin (see Note 2 of Example 1) | 10 |
| Triethyl amine | 7 |
| Deionized water | 845 |
| | 1000 |

(6)

| | |
|---|---|
| Heat-hardening resin solution of Example 6 | 123 |
| Melamine resin (see Note 2 of Example 1) | 20 |
| Triethyl amine | 6.3 |
| Deionized water | 850.7 |
| | 1000 |

(7)

| | |
|---|---|
| Heat-hardening resin solution of Example 6 | 108 |
| Melamine resin (see Note 2 of Example 1) | 30 |
| Triethyl amine | 5.5 |
| Deionized water | 856.5 |
| | 1000 |

All of the above formulations contain 10% non-volatile solids and each is subjected to a direct current at various potentials from 100 to 400 volts. Vigorous agitation is used to mix the components noted above to provide an aqueous electrodeposition bath.

The coating and physical properties shown below are at equal film weights.

The heat-hardening resin of Example 6 is formulated to provide aqueous electrodeposition baths containing 10% solids as indicated hereinbefore, in combination with aminoplast resins, in a weight ratio of 80/20 in order to determine the deposition ratio which is obtained. First, the benzoguanamine resin described in Note 1 of Example 1 was used and the films deposited are analyzed for nitrogen content in order to determine the percentage of the aminoplast resin which has been deposited. Utilizing 20% of the benzoguanamine resin, based on total resin solids, the film deposited contained 20.6% of benzoguanamine resin, substantially the same proportion present in the bath. The experiment was then repeated using the same 80/20 weight ratio mixture, but this time utilizing the water dispersible melamine resin described in Note 2 of Example 1 as the aminoplast component of the mixture. The film deposited, when analyzed for nitrogen content, indicated the presence of only 13.53% of the melamine resin which indicates deposition of aminoplast resin at less than 70% efficiency. Lastly, a water soluble hexamethoxy methyl melamine is used as the aminoplast resin, again utilizing an 80/20 weight ratio. Analysis of the electrodeposited film for nitrogen indicates that only 7.61% of the aminoplast resin was deposited, a deposition efficiency of only 38%.

Continuing the comparison between the various types of aminoplast resins, the benzoguanamine resin served to increase the dielectric constant of the film and therefore to limit film buildup at high voltage. Also, the detergent resistance of the film was improved. In contrast, the water dispersible and water soluble melamine resins lowered the dielectric constant and therefore increased the film buildup. In each instance, the detergent resistance obtained was inferior and, using the water soluble melamine resin, there was very poor control of film deposition.

EXAMPLE 7

Example 6 is repeated using 258 parts of the same tertiary glycidyl ester A used in Example 6. In this way, a product having the following final characteristics is obtained:

| | |
|---|---|
| Solids (percent) | 70 |
| Viscosity (Gardner) | $Z_4$–$Z_5$ |
| Color (Gardner-Holdt) | 2–7 |
| Acid value | 27 |

The solution product so-obtained is formulated into an aqueous electrodeposition bath containing 10% non-volatile solids in the same way previously described, the solids of the bath being constituted as follows:

| | Percent |
|---|---|
| Solution Product of Example 7 | 90 |
| Melamine resin (see Note 2 of (Example 1) | 7.66 |
| Benzoguanamine resin (see Note 1 of Example 1) | 2.34 |
| | 100.00 |

Sufficient triethyl amine is used to provide a pH of 7.9. Electrodeposition is then carried out on phosphate treated steel panels and aluminum panels to obtain the following results.

Phosphate Treated Steel Panels

| Voltage | 50 | 100 | 150 | 200 | 250 |
|---|---|---|---|---|---|
| Coulombs/gram | 31.0 | 32.9 | 34.2 | 30.8 | 31.5 |
| Film Thickness (mils) | 0.3 | 0.5 | 0.7 | 0.9 | 1.05 |

Aluminum Panels

| Voltage | 50 | 100 | 150 | 200 | 250 |
|---|---|---|---|---|---|
| Coulombs/gram | | | 31.2 | 32.4 | 31.5 |
| Film Thickness (mils) | 0.3 | 0.5 | 0.85 | 1.25 | 1.35 |

EXAMPLE 8

Example 7 is repeated with the exception that in addition to the 258 parts of tertiary glycidyl ester A, 20 parts of butylene oxide are added after the acid value has been reduced to 26. The final product has an acid value of 22, a Gardner-Holdt color of 1-2 and a solids content of 70.3%. Similar results are obtained when this resin is dispersed in water and electrodeposited.

Examples 4, 5, 6, 7, and 8 are repeated, but using a pH of 9.0 for the electrodeposition bath. Comparable results are obtained with the exception that the throwing power of the system is increased, the electrical deposition efficiency falls off insignificantly, e.g., about 30% and the film thickness is reduced since the films which are deposited are more resistive. The wet films which are deposited contain very little amine or water-miscible organic solvent, e.g., about 0.1–0.2% for each based on the weight of the film.

Examples 4, 5, 6, 7 and 8 are repeated utilizing the essentially water free resin solution as a feed solution to permit continuous operation. The viscosity of the electrodeposition bath prior to electrodeposition is noted and a control is employed to feed the resin solution involved to the electrodeposition bath whenever the viscosity falls off as a result of consumption of solids in the electrodeposition process. No difficulty is encountered in carrying out the electrodeposition process continuously utilizing solids content as the sole indication of when to add resin solution or when not to add resin solution. Since the resin solutions of Examples 4, 5, 6, 7 and 8 are amine deficient, no excessive buildup in pH is encountered.

EXAMPLE 9

The present example illustrates the utilization of diepoxide as the sole epoxide material used and illustrates how little diepoxide is needed to significantly enhance performance (10 equivalent percent).

| Parts by wt. | | |
|---|---|---|
| 1,000 | 2-Ethoxy Ethanol | Charge into reactor and heat to 130° C. |
| 600 | Isobutyl Acrylate | |
| 860 | Methyl Acrylate | Add. Reheat to 130–135° C. and hold for 3 hours. |
| 400 | Hydroxy Ethyl Acrylate | |
| 140 | Acrylic Acid | |
| 60 | Benzoyl Peroxide | |
| 8 | Benzoyl Peroxide | Add and hold for 2 hours. |
| 4 | do | Do. |
| 1,000 | Above Acrylic Copolymer | |
| 110 | Epoxy Resin (diglycidyl ether of bisphenol A— epoxide equivalent: 525). | Charge into reactor and hold for 2 hours at 120° C. |
| 5 | Triethyl Amine | |

The final characteristics of the polymer are:

Solids (percent) _____ 71.2
Color (Gardner-Holdt) _____ 1–2
Acid Value _____ 41.3

The acrylic copolymer described above and also the epoxy resin-modified copolymer whose characteristics are given above are employed to deposit films on tin panels by electrodeposition on the panel forming the anode of the unidirectional system. Adhesion of the deposited films to the tin panel was checked by scratching the panel and then determining to what extent Scotch tape will remove the film in the vicinity of the scratch. The unmodified acrylic copolymer showed very poor adhesion, but the epoxy resin-modified copolymer exhibited excellent adhesion to the panel, thereby demonstrating that the invention is of significance even when the acid value is above 30 and when the proportion of epoxide used is small.

The invention is not to be construed by any abstract of disclosure, but its features are instead characterized in the description given hereinbefore and is defined in the claims which follow.

We claim:

1. A method of coating a body capable of carrying an electrical current with a uniform weather and corrosion-resistant coating comprising immersing said body in an aqueous bath containing hydroxy-functional hydrophylic resin having an acid number of from about 8 to about 70, said hydrophylic resin being a linear resin containing carboxyl groups and having hydroxy groups generated by epoxide esterification of some of said carboxyl groups to be positioned remote with respect to the linear backbone of said resin, said hydrophylic resin being dispersed in said bath in the form of a salt with a base to provide a dispersion of resin particles in water having an average particle size of less than 0.5 micron, passing a unidirectional electrical current through said bath and through said body as anode to deposit a uniform film of hydrophylic resin thereupon, and baking said film to cure the same.

2. A method as recited in claim 1 in which said hydrophylic resin has an acid number less than 50.

3. A method as recited in claim 1 in which said unidirectional electrical current has a voltage of at least 200 volts.

4. A method as recited in claim 1 in which said epoxide is selected from the group consisting of ethylene oxide, propylene oxide, butylene oxide, glycidyl ester of tertiary monocarboxylic acids, and mixtures thereof.

5. A method as recited in claim 1 in which said bath has dissolved therein at least 12% by weight of water-miscible organic solvent based on the weight of resin dispersed in said bath.

6. A method as recited in claim 1 in which said remotely positioned hydroxy groups are generated by esterification with monoepoxide.

7. A method as recited in claim 1 in which said hydrophylic resin has an hydroxyl number of at least 15.

8. A method as recited in claim 1 in which said base is a nitrogenous base.

9. A method as recited in claim 1 in which said aqueous bath has a solids content of from 5–15%.

10. A method as recited in claim 1 in which said hydrophylic resin has an acid number less than 30 and an average particle size of less than 0.1 micron.

11. A method as recited in claim 10 in which said hydrophylic resin has an acid number of from 12–25.

12. A method as recited in claim 1 in which said linear resin is a polyhydric resin which is reacted with a polycarboxylic acid monoanhydride to generate carboxy groups which are esterified with epoxide to generate hydroxy groups remote from the linear backbone of said polyhydric resin.

13. A method as recited in claim 12 in which said epoxide is a monoepoxide.

14. A method as recited in claim 12 in which said anhydride is trimellitic anhydride.

15. A method as recited in claim 7 in which said linear resin is a polyhydric polyether having a portion of its hydroxy functionality consumed by reaction with monocarboxylic acid.

16. A method as recited in claim 15 in which said monocarboxylic acid is a fatty acid and is used in an amount to react with from 20–80% of the hydroxy functionality in said polyhydric polyether.

17. A method as recited in claim 16 in which said polycarboxylic acid monoanhydride is trimellitic anhydride.

18. A method as recited in claim 1 in which said aqueous bath has a pH of at least 8.5.

19. A method as recited in claim 18 in which said hydrophylic resin has an acid number less than 30 and said aqueous bath has a pH in the range of from 8.6 to 9.4.

20. A method as recited in claim 1 in which said linear polyhydric polyether is an aliphatic polycyclic polyether.

21. A method as recited in claim 20 in which said polycyclic polyether has the formula:

$$HO-\underset{}{\bigcirc}\underset{O}{\overset{OH}{\bigcirc}}-\left[\underset{O}{\overset{OH}{\bigcirc}}\right]_n \underset{}{\bigcirc}\underset{OH}{\overset{OH}{\bigcirc}}$$

n=10-14

22. A method as recited in claim 1 in which said bath has dispersed therein in association with said hydrophylic resin, a water insoluble aminoplast resin.

23. A method as recited in claim 22 in which said aminoplast resin is a heat-hardening condensate of formaldehyde with benzoguanamine.

24. A method as recited in claim 1 in which the electrodeposition process consumes resin solids from said aqueous bath and causes the accumulation of excess base in said bath, said solids being replaced and said excess base being consumed by adding directly to said bath an essentially water free organic solvent solution of said hydrophylic resin in its acid form dissolved in water-miscible organic solvent in order to maintain the solids content of said bath at a desired level in the range of from 5–15% by weight.

25. A method as recited in claim 24 in which said solvent solution of hydrophylic resin is pigmented.

26. A method as recited in claim 24 in which water insoluble heat-hardening aminoplast resin is dissolved in said organic solvent solution.

27. A method as recited in claim 24 in which said organic solvent solution contains at least 12% by weight of water-miscible organic solvent, based on the weight of resin in said solution.

28. A method as recited in claim 27 in which said water-miscible solvent is selected from the group consisting of dioxane, ethanol, isopropanol, 2-ethoxy ethanol, methyl ethyl ketone, 2-ethoxy ethanol acetate, propyl alcohol, butoxy ethanol, 2-ethoxy diethylene glycol, and 2-butoxy diethylene glycol.

29. A method as recited in claim 1 in which said aqueous bath further includes dispersed aminoplast resin.

30. A method as recited in claim 29 in which said aminoplast resin is a water insoluble aminoplast resin compatible with said hydrophylic resin so that said unidirectional electrical current causes simultaneous deposition of both of said resins in approximately the same proportion as said resins are present in said bath.

31. A method as recited in claim 1 in which said hydrophylic resin is an addition polymer containing free hydroxy and carboxylic acid groups, a portion of said carboxylic acid groups being esterified with a stoichiometric deficiency of epoxide with respect to said carboxylic acid groups to reduce the acid number of the product to a value in the range of from about 8 to about 70 and to generate additional hydroxy functionality remote from the backbone of the polymer.

32. A method as recited in claim 31 in which at least a portion of the acid groups in the final product are reacted with a nitrogenous base.

33. A method as recited in claim 31 in which said epoxide is a monoepoxide used in a stoichiometric deficiency of from 10–95% with respect to the carboxylic acid groups of said polymer.

34. A method as recited in claim 31 in which at least 70% by weight of said copolymer is constituted by acrylate esters containing from 1 to 4 carbon atoms in the ester group.

35. A method as recited in claim 31 in which said epoxide is a monoepoxide.

36. A method as recited in claim 35 in which said monoepoxide is selected from the group consisting of ethylene oxide, propylene oxide, butylene oxide, glycidyl ester of tertiary monocarboxylic acids, and mixtures thereof.

37. A method as recited in claim 36 in which said monoepoxide is a glycidyl ester having the formula:

$$R_2-\underset{R_3}{\overset{R_1}{\underset{|}{C}}}-\overset{O}{\overset{\|}{C}}-O-C-C\overset{O}{\diagup\diagdown}C$$

in which $R_1$ and $R_2$ are alkyl radicals having a chain length of from 2–18 carbon atoms and $R_3$ is the same as $R_1$ and $R_2$ or hydrogen.

38. A method as recited in claim 31 in which said addition polymer contains carboxy-functional component in an amount of from 4–30 equivalent percent.

39. A method as recited in claim 38 in which said carboxy-functional component is selected from the group consisting of acrylic acid, methacrylic acid and crotonic acid.

40. A method as recited in claim 39 in which said carboxy-functional component is present in an amount of from 5–12 equivalent percent.

41. A method as recited in claim 31 in which said addition polymer contains hydroxy-functional component in an amount of from 4–40 equivalent percent.

42. A method as recited in claim 41 in which said hydroxy-functional component is selected from the group consisting of 2-hydroxy ethyl acrylate, 2-hydroxy propyl acrylate, 2-hydroxy propyl butyl maleate, 2-hydroxy ethyl methacrylate, 2-hydroxy propyl methacrylate, 2-hydroxy methyl-5-norbornene, allyl alcohol, methallyl alcohol, 2-hydroxy ethyl crotonate, 2-hydroxy propyl crotonate, and crotyl alcohol.

43. A method as recited in claim 42 in which said hydroxy-functional component is present in an amount of from 10–25 equivalent percent.

References Cited

UNITED STATES PATENTS

| | | | |
|---|---|---|---|
| 3,410,773 | 11/1968 | Hagan et al. | 204—181 |
| 3,364,162 | 1/1968 | Huggard | 204—181 |
| 3,230,162 | 1/1966 | Gilchrist. | |

FOREIGN PATENTS

| | | |
|---|---|---|
| 1,019,658 | 2/1966 | Great Britain. |
| 1,365,414 | 5/1964 | France. |

HOWARD S. WILLIAMS, Primary Examiner

UNITED STATES PATENT OFFICE
CERTIFICATE OF CORRECTION

Patent No. 3,516,913            Dated June 23, 1970

Inventor(s) Kazys Sekmakas, Edward A. Gauger, Jr. and Lester A. Henning

It is certified that error appears in the above-identified patent and that said Letters Patent are hereby corrected as shown below:

Column 5, line 53, "carboylic" should read --carboxylic--; Column 6, line 46, "leaest" should read --least--; Column 12, line 50, insert a comma after "free"; Column 12, line 52, "polyester" should read --polyether--; Column 12, line 56, "Polyester" should read --Polyether--

Column 14, line 19, "as measured by nitrogen analysis, almost" should read --is added, the rupture voltage is increased--; Column 15, line 54, "18" should be --19--; Column 17, line 63, "the" (first occurrence) should be deleted; Column 18, line 34, "2 1/" should be --2 1/2--;
Column 22, claim 15, line 1 of the claim "7" should be --12--

SIGNED AND SEALED
JAN 5 1971

(SEAL)
Attest:

Edward M. Fletcher, Jr.
Attesting Officer

WILLIAM E. SCHUYLER, JR.
Commissioner of Patents